(12) United States Patent
Protassov et al.

(10) Patent No.: US 8,843,921 B1
(45) Date of Patent: *Sep. 23, 2014

(54) SYSTEM AND METHOD FOR CONTROLLING INSTALLED THIRD PARTY SOFTWARE COMPONENTS

(71) Applicant: Parallels IP Holdings GmbH, Schaffhausen (CH)

(72) Inventors: Stanislav S. Protassov, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 110 days.

This patent is subject to a terminal disclaimer.

(21) Appl. No.: 13/740,324

(22) Filed: Jan. 14, 2013

Related U.S. Application Data

(63) Continuation of application No. 13/026,257, filed on Feb. 13, 2011, now Pat. No. 8,356,293, which is a continuation of application No. 11/264,098, filed on Nov. 2, 2005, now Pat. No. 7,904,901.

(51) Int. Cl.
*G06F 9/445* (2006.01)

(52) U.S. Cl.
USPC .......................................... 717/178

(58) Field of Classification Search
USPC ............... 717/124, 162, 170, 174, 111, 168, 717/175–178; 709/220–223, 217, 232, 226, 709/229; 711/1, 601; 714/36; 710/68; 719/331; 463/43
See application file for complete search history.

(56) References Cited

U.S. PATENT DOCUMENTS

| | | | |
|---|---|---|---|
| 6,253,258 B1 | 6/2001 | Cohen | |
| 6,466,999 B1 | 10/2002 | Sliger et al. | |
| 6,694,510 B1 | 2/2004 | Willems | |
| 7,085,822 B1 | 8/2006 | Donatelli et al. | |
| 7,120,675 B1 | 10/2006 | Shupak et al. | |
| 7,162,710 B1 | 1/2007 | Edwards et al. | |
| 7,219,266 B2 | 5/2007 | Glerum et al. | |
| 7,222,341 B2 | 5/2007 | Forbes et al. | |
| 2003/0217255 A1* | 11/2003 | Wyatt | 713/100 |
| 2004/0107416 A1 | 6/2004 | Buban et al. | |
| 2004/0204949 A1 | 10/2004 | Shaji et al. | |
| 2005/0120160 A1 | 6/2005 | Plouffe et al. | |
| 2006/0020936 A1* | 1/2006 | Wyatt | 717/162 |
| 2006/0277539 A1 | 12/2006 | Amarasinghe et al. | |
| 2006/0281556 A1 | 12/2006 | Solomon et al. | |

* cited by examiner

*Primary Examiner* — Tuan A Vu
(74) *Attorney, Agent, or Firm* — Bardmesser Law Group (57) ABSTRACT

A method of controlling operation of an installed component includes generating auxiliary information relating to the installed component in user space; launching a control program in operating system space for controlling operation of the installed component; and controlling, from the operating system space, the operation of the installed component using the auxiliary information. The installed component can be an operating system component running in a Virtual Private Server, or a component of third party software. The auxiliary information can be, e.g., time stamps, CRC, access control information, function names, function address offsets and function parameter passing information derived from the debug file. The controlling step can patch the installed component. The patch can be version-specific to the installed component. The controlling step can monitor behavior of the installed component. The auxiliary information can be generated based on a debug file/pdb file.

22 Claims, 8 Drawing Sheets

SYSTEM AND METHOD FOR CONTROLLING INSTALLED THIRD PARTY SOFTWARE COMPONENTS

CROSS-REFERENCE TO RELATED APPLICATIONS

This application is a continuation of U.S. patent application Ser. No. 13/026,257, filed on 13 Feb. 2011 (now U.S. Pat. No. 8,356,293), which is a continuation of U.S. patent application Ser. No. 11/264,098, filed on 2 Nov. 2005 (now U.S. Pat. No. 7,904,901), which are both incorporated by reference herein.

BACKGROUND OF THE INVENTION

1. Field of the Invention

The present invention is related to a method and system for distribution of software related information that is required for running the software in different execution environments.

2. Related Art

Frequently, there are three types of software that are installed on a computer system. The first is the operating system itself. The second is application software that is normally loaded with the operating system (for example, when the hard disk drive is installed by the original equipment manufacturer, or OEM). The third is third party application software, such as games, database packages, third party word processors, etc., that is installed by the user subsequent to purchasing the computer.

Consider a certain application that is currently running on a computer. It may be necessary to supervise behavior of a component of that application, e.g., to perform a patching of the code of this application, depending on the run-time conditions of the installed third party component that behaves in an unforeseen manner, e.g., shared components of the application or components that result from application execution. In other words, the file itself that is stored on some storage media (such as a disk drive) needs to be patched, or the code that is loaded into memory or produced during execution needs to be patched, shared, or processed in some unforeseen manner. In order to accomplish this, it is necessary to know additional information related to the application for executing appropriate patching or modification of application behavior in a safe manner.

Such information may be addresses or offsets of the functions (or pieces of code) that are being patched. Another kind of information may be system settings such a registry settings provided during execution of the installed component. Also descriptions of file trees of even files may be unintentionally hidden or absent, or such information can depend on the environment where the installed component is running.

Conventionally, the user cannot readily retrieve such information. For example, the code of the application needs to be disassembled, and using a relatively complex process, offset addresses in some cases can be determined. This is frequently difficult and can run into a problem of violating either the copyright of the owner of the application software, or the license that is associated with that software. Also, even with sophisticated algorithms for reverse assembly, determination of the offset addresses of the relevant functions is not always possible.

Also, if the user has to configure auto-configured software in a specified manner, e.g., for execution of a software component in a virtual environment, such a task may be non-trivial, since some virtual environment runtime objects, properties or configurations might not be recognized by auto-configuration mechanisms.

Accordingly, there is a need in the art for producing and distribution of the information related to the installed software component that is unintentionally hidden or strictly unrecoverable, for the purpose of modifying the behavior of the installed component, or monitoring its behavior.

SUMMARY OF THE INVENTION

Accordingly, the present invention is directed to recovering and distributing unintentionally hidden or unrecoverable information for controlling behavior of third party installed components that substantially obviates problems of the related art.

In one aspect, there is provided a system, method and computer program product for controlling operation of an installed component that includes generating auxiliary information relating to the installed component in user space; launching a control program in operating system space for controlling operation of the installed component; and controlling, from the operating system space, the operation of the installed component using the auxiliary information. The installed component can be an operating system component running in a Virtual Private Server, or a component of third party software. The auxiliary information can be, e.g., time stamps, CRC, access control information, function names, function address offsets and function parameter passing information derived from the debug file. The controlling step can patch the installed component. The patch can be version-specific to the installed component. The installed component can be running in a Virtual Private Server. The controlling step can monitor behavior of the installed component. The auxiliary information can be generated based on a debug file, which can be a pdb file. The generating step generates offset address information for instructions in the object code.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Exemplary Applications of the Invention

A typical circumstance where the invention can be applied is a computing system where software means (hereafter—installed components), such as user level applications, OS/kernel level modules, system drivers, etc., is used in an environment that originally was not designed for supporting these installed components. In some cases, a new environment, such as an operating system, may be started on a computing system, or an upgrade to an operating system needs to be added. After installation of the operating system upgrade, or a new operating system, including installation or replacing hardware means, the installed component therefore may need to be patched, configured or upgraded, to ensure that the installed component is compatible with the newly installed upgrade (for convenience of discussion, only a single installed component will be discussed, although the invention is applicable to multiple such installed components). In one embodiment, the component may be installed in a Virtual Private Server (VPS) or some other virtualization means that runs with support of the host operating system. The Virtual Private Server uses host operating system means for supporting installed components. In this case, it is desirable to preserve functionality of installed components despite changes in the host operating system. However, such an upgrade or patching or installation new operating system may be incompatible with the installed component and may cause problems in functionality of the installed component in the execution environment.

In this case, additional data relating to the installed component—hereafter, "auxiliary information," which is not available at the time of installation of the component, is required for ensuring consistency between the execution environment and the installed component, and to control the behavior of the installed component during execution. Also, some means for utilizing the auxiliary information is necessary.

DEFINITIONS

"Auxiliary information," as used in this application, is a set of bytes that may be structured. Auxiliary information is necessary to support functionality of a component installed in the software execution environment, and is needed to ensure that the installed component functions in an environment that differs from the environment anticipated by the installed component's developers. For example, this may arise in a virtual environment with emulated hardware that could not be properly detected and/or configured during component installation.

"Identifier," or "auxiliary information identifier," as used in this application, is a set of bytes that characterizes additional information used by a control program in order to ensure correct installation of the component in the software execution environment, including, for example, correct recognition of virtual hardware and communication therewith.

"Descriptor," or "auxiliary information descriptor," as used in this application, is a meaningful part of the auxiliary information that is adapted to the control program. The control program uses descriptors for providing predictable functionality of the installed component.

"Control software," as used in this application, is executable software, that uses auxiliary information and configures (or otherwise changes) communications between installed components that it monitors or controls, and the software execution environment.

"Template," as used in this application, is an example of auxiliary information descriptor that may be applied to the installed component or may be embedded in the software execution environment.

Auxiliary Information

The present invention is therefore related to retrieving certain information ("auxiliary information") related to third party application software (particularly the kind of information that is not available through conventional methods, such as reverse compilation and similar approaches) for the purpose of controlling behavior of installed components of the third party software. Preferably, auxiliary information is unintentionally hidden, or strictly unrecoverable. This is to be distinguished from information that is readily available from files used to install the installed component, such as version number, date of creation, etc. It is also to be distinguished from antivirus software, spyware, catalogs, mp3 libraries, browser plug-ins, database CDs and patching, and performance evaluation software, since present invention deals with, and performs operations on, a predefined (e.g., known software from known manufacturer) and in some embodiments, preinstalled software, having known and predictable properties. The invention can also be directed to adaptation of already installed components and execution environments to each other, but is not intended to cover simple patching or upgrading software, e.g., updating a version of a software, or installing security patches, adding plug-ins and so on.

For example, when unpacking files from a CAB archive, the date of unpacking can be treated as the date of file creation, and the file can be unpacked as a read only file. In this case, the metadata associated with the file prior to its packing is replaced with metadata provided by the execution environment. After unpacking the file and wiping of the CAB archive, the original time stamps and some security and access attributes becomes hidden and unrecoverable from the unpacked file. The original attributes that may be required for proper software execution may be considered an example of auxiliary information.

In another example, the files can be part of the auxiliary information, if the files, e.g. files that contain configuration information are generated (but not yet unpacked) in the process of the original installation of the operating system and the component. Obviously, these files cannot be such that they are intentionally hidden or null files.

Offset address information, which is one type of auxiliary information, is normally available through debug control functions, and is generated at compilation time. Note that the debug information may be incomplete, or may be entirely absent from the compiled application code. However, the debug information is frequently stored in separate files in much of the modern application software writing practice.

For example, in the case of software development in the MS Windows context, so-called pdb files (Program DataBase files, see http://msdn2.microsoft.com/library/yd4f8bd1 (en-us,vs.80).aspx are used to store the debug information. The pdb files contain information about the functions and their offset addresses within memory. Frequently pdb files are shared for diagnostic purposes.

The pdb files may be generated at the time of code compilation. The pdb files contain information about the names of the callable functions, and their address offsets within the compiled code. Knowing the information contained in the pdb files, it is usually possible to calculate the location of the particular piece of code (for example, the code of a function that needs to be called) for various purposes, such as, e.g., for online patching. This is to be distinguished from information that is "readily available" to the owner of the software. Examples of each "readily available" include version number, version date, file size, etc. However, in many instances, this "readily available" information is insufficient. For instance, it may be necessary to also know the manner in which the function passes parameters.

In another example, particularly when using open source software, the information derived from the pdb files can be used to replace or modify code of the installed component.

It should be noted that pdb files, or other types of debug files, are frequently available for many applications. The object code files for third party application software are also available and distributed by the developer of the application software. The pdb files contain offset address information for the instructions in the object code.

However, the source code is usually not available to the user. This means, for example, that, as noted above, address offsets are very difficult, if not impossible to derive using the object code alone. The present invention utilizes the object code and debug or pdb files together, to derive the address offsets for the code being patched. It should also be noted that for many user applications, there are numerous versions of such software that can be installed on an end user machine. Some of these are major releases (in the industry, commonly designated by a different version number, e.g., 1.0, 2.0, 3.0, etc.), sub-releases (designated by, e.g., 2.1, 2.2, etc), minor updates that only fix small bugs, designated by, e.g., 2.2.1, 2.2.2, etc. Note that each of these versions and sub-versions can theoretically have different address offsets in the object code. Thus, it may be necessary to generate a unique set of patches and/or other configuration information for each version and sub-version of the application software, such that each such set corresponds to a particular version or sub-version.

Also, the distributor of the operating system upgrade usually knows which versions of the particular application software would cause problems due to incompatibility with the operating system upgrade, and can therefore provide such a patch, if necessary. Similarly, the distributor of the operating system upgrade knows which procedures, or which portions of the object code, in the third party application software, can cause problems, and will therefore know which code in the third party application software needs to be patched.

The point is not so much distributing files per se, but ensuring that third party application software (such as user applications, and, in some cases, operating system-type files) can function in a manner that is controlled/monitored by the control software and is compatible with what the operating system of (for example) a server on which multiple VPSs are running expects. This monitoring/control can be done in any number of ways. One example is patching of the code of the installed component prior to installation. Another example is on-the-fly patching of the code that is already running, such as described in U.S. patent application Ser. No. 10/725,016, filed on Dec. 2, 2003, entitled SYSTEM, METHOD AND COMPUTER PROGRAM PRODUCT FOR ON-THE-FLY PATCHING OF EXECUTABLE CODE, which is incorporated herein by reference in its entirety.

Note that the list of files being patched and file names corresponds to the actual files used by the operating system, as distinct from a mere listing of the files using some equivalent of the MS-DOS "DIR" command. In other words, all the files, including system files, hidden files, etc., are identified.

In order to accomplish this, a data structure is created, where each of the files in the actual file structure is replaced by a "file" of zero length. However, its "location" corresponds to some template of the operating system (notwithstanding the fact that its contents is null). The data structure is then archived. Note that the archive can contain not just the null-length files, but also access control lists, and optionally attributes of the operating system, such as date of creation, date of modification, etc., which are necessary to enable creation of a link to the appropriate actual physical file with the right contents.

Note that the present invention can also be applied to hidden files, and system files, which can be patched in the same manner as third party application files or other third party installed components.

In other words, for the normal functioning of a particular Virtual Private Server, the Virtual Private Server needs all or some subset of the files of the operating system. The absence of some files from that subset will cause the VPS to fail. The present invention, in one embodiment, provides a list of the files, together with the links to the substitute (or, alternatively, only some of the files may be substitute files and others will be the same). In other words, in order to create a "full blown" VPS, the storage space that would be nominally required is comparable to the size of a CD ROM, on the order of 500-700 MB. Obviously, the size is dramatically reduced, if instead of the files themselves, only the list of files and links to the files are distributed.

The actual files to which the links point to can then be substituted, or manipulated, at will. Note that the changes to the executable code in the files can be done both in an online and offline regime. In an offline regime, the contents of the actual files is substituted, and then, used by the user application. In an online regime, the process is generally analogous to online patching. In other words, the processes or threads that were launched as a result of the executable files at issue can be modified online.

The auxiliary information at issue is generated, for example, by extracting it from the debug (pdb) files, and is then distributed together with the software designed for configuring and supporting software that is used in connection with the already installed component, e.g., for example, with means for supporting virtual execution environments with common or shared components. Some examples of software execution environments with common or shared components where the invention may be utilized are disclosed in U.S. patent application Ser. No. 09/918,031, filed Jul. 30, 2001, entitled Virtual Computing Environment, and U.S. patent application Ser. No. 10/703,594, filed Nov. 10, 2002, entitled VIRTUAL PRIVATE SERVER WITH ISOLATION OF SYSTEM COMPONENTS and U.S. patent application Ser. No. 10/837,757, filed Jul. 29, 2004, entitled Virtual Private Server with Enhanced Security, which are incorporated herein by reference. When the component is being installed, the auxiliary information (such as offset addresses, etc.) is then used. Also, it should be noted that the information at issue is primarily relevant in the context of dealing with third party software (since presumably any vendor of software would have the address offset information about its own software).

Alternatively, information about allocation of real physical and virtual memory is used as the auxiliary information, which is a consequence of the installation of the component. In particular, part of the address space can be distributed between the various procedures, and some of the procedures can be given virtual (dynamic) addresses in the process of installation. This information is also used by the analysis process to derive the patching information. It should be noted that in some instances in order to determine the distribution of the virtual address space and its correspondence to physical memory allocation layout, it is necessary to load and/or execute corresponding system files and procedures (for example, DLL procedures).

The files that contain the auxiliary information can be provided as a zip archive, or other types of archives, which includes the following:

an identifier of the program module, for example, a system file;

a procedure identifier; and memory allocation layout and offset address information, for example, including offset address and length of the code).

In another example, the file with the auxiliary information can include file structure templates and system registries, which are generated when the software component is installed.

Identifiers

To solve this problem, the user or a procedure running on the user's computing system, compiles a set of the auxiliary information identifiers that are sufficient for recovering auxiliary information descriptors (discussed further below). The identifier may be associated with the installed component, or may be generated based on requirements of the control software. Such identifiers can also include version or build of the operation system after updating, as well as (optionally) information about installed patches, for example, for shared structures that have already been installed. The identifiers can also include keys relating to third party programs, serial numbers, system configuration of particular VPSs, and can include emulated or real hardware accessible to the VPS that is being set up for correct operability. External procedure names can also be used as auxiliary information identifiers.

The auxiliary information identifiers relate to the installed component. In other words, the control software uses the identifiers (upon installation and execution of procedures and function calls of the installed component) to control execution behavior of the installed component. Thus, the identifiers are used by the control software either during installation of the installed component, or during its execution.

Examples of such identifiers of the installed component can be procedure names, system folder names, and/or file names created when the component is installed, and check sums (CRC, CRC32) that relate to corresponding files.

As another example, the auxiliary information identifier can be a file, or a file name (for example, xxx.DLL (dynamic linked library), or xxx.CAB, which itself contains some information about the file, in the sense of metadata (for example, the "CAB" extension may contains information about how the file is packed). This file name is defined by properties of the control software, and can be given either at the time of file creation, or at the time of installation of the component. In other words, the control software needs to know that the file with a certain name contains certain types of information. In one example, the auxiliary information identifier can include registry contents, or some subset of the registry (hive). The registry settings or registry hives are formed and configured upon installation of the operating system and installation of the component on one physical computer, thereby providing and forming auxiliary information descriptors, which in turn can be used on the user's computer with the installed component, that requires the auxiliary information to ensure functionality of the installed component.

Alternatively, information regarding distribution of physical or virtual memory can be used as identifiers, which is a consequence of installation of the third party component.

The auxiliary information identifier can be generated during the installation of the third party software component, in the software execution environment that is created by the operating system. The operating system can analyze (among other things) register and install file contacts, after which an analogous system can be recreated on a Virtual Private Server. Note that in some implementations of Virtual Private Servers or their supporting systems, it is not necessary to provide the files themselves, since only links to the replacement or modified files can be provided. In some implementation VPSs may have unique for certain VPSs processes and objects as well as shared processes and objects in all VPSs or groups of VPSs.

The approach described herein is applicable both to VPSs (or, more broadly, virtual environments) with fully isolated components, and to VPSs with shared components and combination thereof. Parallels Container/Virtuozzo™—like technologies, as well as Virtual Machine Technologies, such as the XEN project, MICROSOFT VIRTUAL PC, VMWARE Workstation and others may be chosen as a platform for implementing the invention. Systems with hardware support (e.g., INTEL VT or AMD Pacifica platforms) or without hardware support of virtualization technologies may be used as well.

One example of using such an approach is virtualization means that uses virtual machines with fully isolated components. It should be noted that VPSs described below are only particular examples of realization of the invention.

Descriptors of auxiliary information corresponding to the identifiers can be retrieved, e.g., by installing a third party component on the physical server with configuration corresponding to the user's VPS. After that, system files and settings are analyzed and descriptors are extracted and sent to the user. In some cases, descriptors cannot be easily derived from the object code file itself but can be derived from the pdb files (or other types of debug files) on the basis of identifiers of the information necessary for correct functioning of the installed component. Such identifiers may be file names of system files, CRC or hash values, registry keys, time stamps, access control information, access control lists, function names, function parameter passing information, etc.

Control Software (Control Program)

The control software controls or modifies behavior of the installed component, by, for example, patching of the files of the installed component or by relocation of the installed component files.

In some cases, the software execution environment can include hardware part of the computing system. For example, the control software can collect additional information related to the software execution environment or to installed component and utilize that auxiliary information depending on the collected information.

As one example, the control software can be integrated into code that launches the Virtual Private Server. For example, the launching of the VPS can also include patching (or other forms of control or monitoring) of any operating system code that runs within the VPS, in other words, it forms a software and even a hardware part (taking into consideration the hardware emulation issue) of the computing system from the point of view of the external user. Another possibility is that an attempt by the user to install a third party application component will be detected by the Virtual Private Server, triggering intervention by the control software, such that compatibility between the user application component about to be installed and the version of the operating system running on the computer is assured.

Note that the control software can also be a set of procedures that are integrated into Virtual Private Server startup and/or initial configuration routines that support correct functionality of operating system mechanisms. Thus, the method described herein can be used for Virtual Private Server launching, as well as for assuring continuity of functionality of the VPS and the user applications running within it, when the operating system of the computer has been upgraded.

When a VPS is launched, standard methodology and operating system mechanisms cannot be used to ensure proper configuration of the VPS. For example, registry hives, system utilities, libraries and other files mainly present in an area shared for the plurality of VPSs and are not created and configured as it were during OS regular installation. To overcome this problem, data may be generated, for example, during the installation of the actual physical server with corresponding hardware configuration, or such data may be gained by any alternative method, e.g., by using emulation software. Then the auxiliary information descriptors can be used during the launching and running of the VPS and the software inside VPS.

The file (that is distributed) with the additional data can be used as is, or can be a database, or an archive that can be unpacked and installed into the software execution environment (where the software execution environment is formed is launched with the intervention of the operating system, the installed component, and the control software).

It should also be noted that when a VPS is used, a corresponding file structure is created. This file structure, which includes a root catalogue, folders, and files, corresponds partly or completely to a file structure that has already been formed on system installation on a different computer (or on the same computer, but without the use of the patching—it should be remembered that the file structure by itself can be viewed as a descriptor of additional information, since the structure exists apart from the files themselves and their contents. For example, the additional structure can include file attributes, for example, read-only, access control, list, time stamps, and CRC. These files can be replaced by links. (Generally, the files to which the links are provided are not part of the information derived from the debug files.) Note also that the file attributes (and other metadata) can be added to those files that previously did not have them.

For example, when unpacking the files from CAB archives, the date of creation of the file is the date of the unpacking. At the same time, the file can be unpacked as a read-only file. In this case, the metadata of the unpacked file is replaced by metadata derived from the pdb files. The packing assumes generation of some identifiable structure, for example, an archive or a database. As one example, the archive can contain procedure names and memory allocation layouts for those procedures.

In one embodiment, the files can be part of the information derived from the pdb (or debug) files, if these files were generated (but not unpacked) in the process of the original installation of the third party component. Obviously, such files cannot be intentionally hidden files, nor can they be files with null data.

Descriptors

The auxiliary information descriptor can describe the installed component, or can be used for configuration the installed component when the installed component is running in the operating system. Typically, the descriptors are unprotected, in other words, no special effort has been made to make them hidden, unrecoverable, or make it appear missing.

Examples of auxiliary information include state values, initial values of variables, entry or exit points of functions and procedures, process priority, or environment settings required for software execution, file system structures, memory and disk space allocation settings, and other attributes of the installed component.

In this case, the descriptor relates to offset addresses of procedures (or of data blocks or some other unit), that need to be modified (for example, by patching) during an installation or execution of the installed component. Here, the term "unit" can be used to describe some elemental portion of the installed component, which, from the perspective of the control software, can be treated as a unitary whole that needs to be "isolated" and modified (controlled, monitored, patched, etc.). In this case, the relevant descriptor information relates to the procedure addresses and addresses of data blocks that need to be modified (patched). In other words, the concept of some "unit" is used to identify characteristics of a certain "atomic" portion of the third party component, which can be viewed as a unitary structure, which has to be isolated and modified.

Also, it should be understood that when the operating system is installed, on the computer and when the third party software component is installed, a certain configuration of the execution environment is created that is necessary for the installed component to run. For example, a file structure needs to be created, which is embedded in the Virtual Private Server. This file structure (a root catalog, files' and folders' names) may corresponds entirety, or partially to a structure that was formed on a different computer (or on the same computer, but without the control software). The file structure may contain an auxiliary information descriptor, which is, for example, the name of the root directory, used as a system folder, and the relationships (e.g., a sub-tree structure) and file names inside a structure are auxiliary information descriptors. Furthermore, the auxiliary information can also include file attributes, for example, "read only," "execute only," access control lists, time stamps and CRCs (cyclic redundancy checks). Such attributes may be used to update file's metadata to ensure correct functioning of the installed component. In this case, the control software can use such auxiliary information and replace the files with links to the files, such that the links point to files that are stored in shared or common folder and are guaranteed to function properly when the installed component runs. Such files can be either part of the VPS, or it can be part of the operating system file structure. Here, the control software can change the file attributes, or the metadata associated with those files, as required.

In the case of VPS, the control software can generate a list of procedures, information about which is necessary to install and launch the VPS. Identifiers of the procedures can be treated as auxiliary information identifiers. These procedures presumably need to be modified in some fashion (for example, patched or configured in special for certain VPS manner), and therefore it is necessary to know the offset addresses of these procedures. The offset address information and the memory allocation layout information can be found in debug files, as one example (in the case of Windows, these are typically known as pdb files). Sometimes they are supplied together with Windows and/or with the third party software component, although more commonly they are provided separately. Note that the information can be obtained over any of the commonly used mechanisms, such as over a network, Internet, distributed on a storage medium, etc.

In one embodiment, the version of the installed component can be checked by the control software. If the version does not correspond to one that is compatible with the current version of the operating system (for example, after an OS upgrade on the physical server), the control software can then request (for instance, over a network) the auxiliary information that is necessary to ensure functioning of the installed component (or it can request data, such as debug files, or pdb files, that can be used to generate the auxiliary information). Note that the invention does not depend on which mechanism is used to distribute the debug files, or to generate the auxiliary information. As one example, the auxiliary information can be sent from a remote server, and installed on demand. As another example, the auxiliary information can be used upon a first instance of the use or installation of the component.

Templates

The present invention is also related to the creation of templates that relate to files used by the operating system. For example, identification of operating system files that should belong to each particular Virtual Private Server can be done, e.g., based on the configuration of the virtual environment, such as emulated hardware settings. In other words, the present invention can provide, in one embodiment, identification and certain information about such files that may be shared or installed in a private area of the VPS.

For example, consider a situation where a physical computer is used as a server, with multiple Virtual Private Servers (VPS) running on it. The shared components of the VPS are reflected in the VPS as templates or stubs where stubs describe the corresponding file and allow operating system of the VPS read structures from the shared area. Indeed, updating of the files in the shared area can cause templates or stubs to be invalid, and consequently repair of the stubs or even the whole VPS could not be performed without information that characterizes behavior of the installed component in the updated execution environment. A simple copying of the shared file to the private area of the VPS does not resolve this problem.

Figure 1:
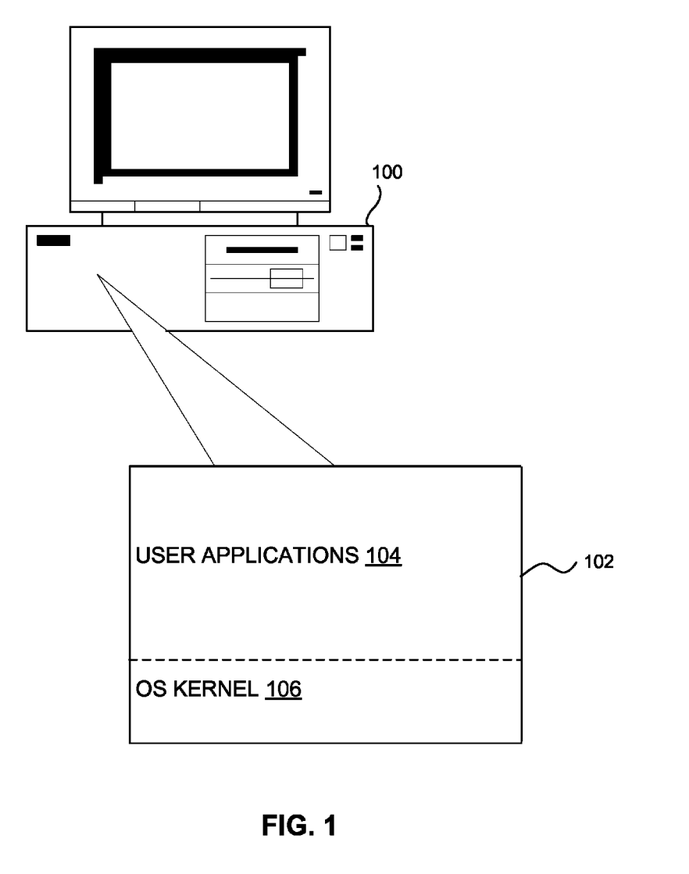
FIG. 1 illustrates a typical system where the invention may be used.

Another problem is that to make new templates the user should know information that is sufficient to define structures of the VPS that should be updated, and needs to therefore setup corresponding structures of the shared area. The present invention, in one embodiment, provides a simple mechanism for supporting template creation or modification. In this case, file information required for functioning of the VPS includes the auxiliary information descriptor, and auxiliary identifier of the VPS, e.g., VPS version and identifier of the virtual environment. For example, the OS version that is supported may be used as the auxiliary information descriptor. Furthermore, the control software installs and supports templates for proper functioning of the VPS inside the OS Illustration of One Embodiment FIG. 1 illustrates a typical system where the invention may be applicable. As shown in FIG. 1 is a computer system 100, such as a desktop, or a laptop, or a desktop or a server that supports a virtual environment running thereon. Software 102, installed on the computer system 100, includes user applications 104 and an operating system kernel 106.

Figure 2:
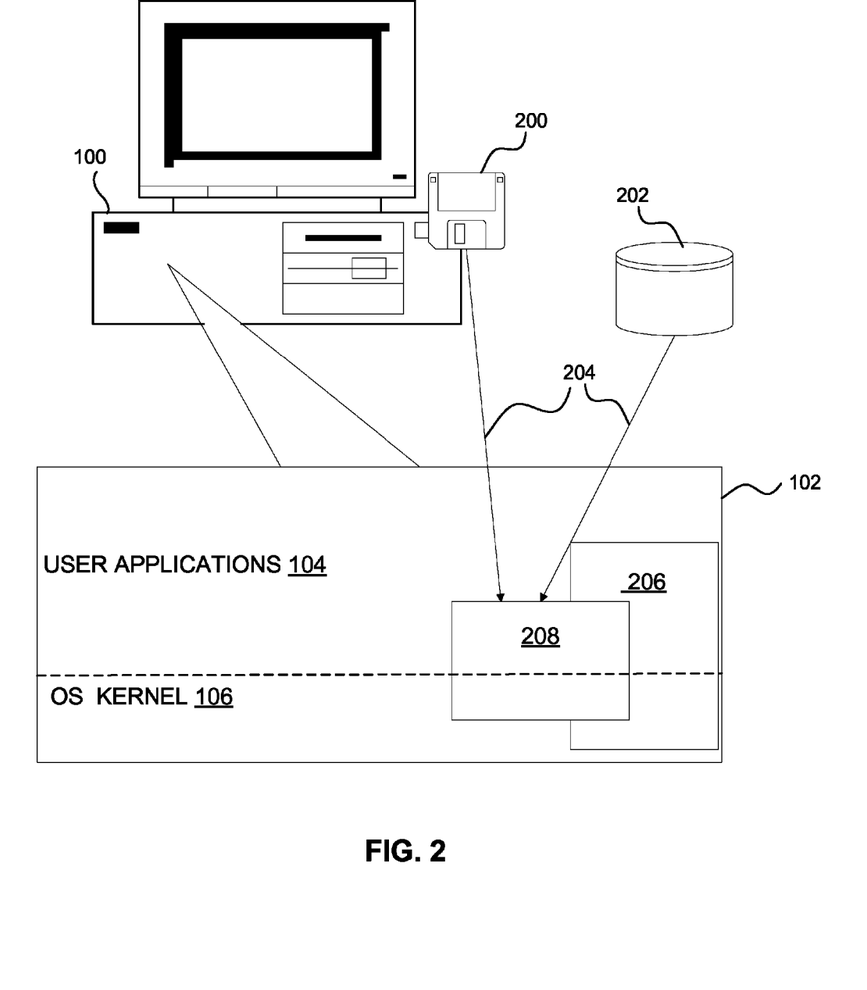
FIG. 2 illustrates the relationship between the system and the patches that need to be distributed.

FIG. 2 illustrates the relationship between the computing system 100 and the patches that need to be distributed. As shown in FIG. 2, patches 208 can be added to the computing system 100 so as to modify the user applications (or third party installed components) 104. In FIG. 2, 206 designates third party applications that do not require patching.

200 is a removable medium, such as a floppy drive or a CD-ROM, which can be a source of patches 208 that need to be distributed. 202 designates a network drive, which can be another source of patching. 204 designates transmission channels that can be used to deliver the patches, for example, internal buses in the computing system 100, Internet, phone lines, etc.

Figure 3:
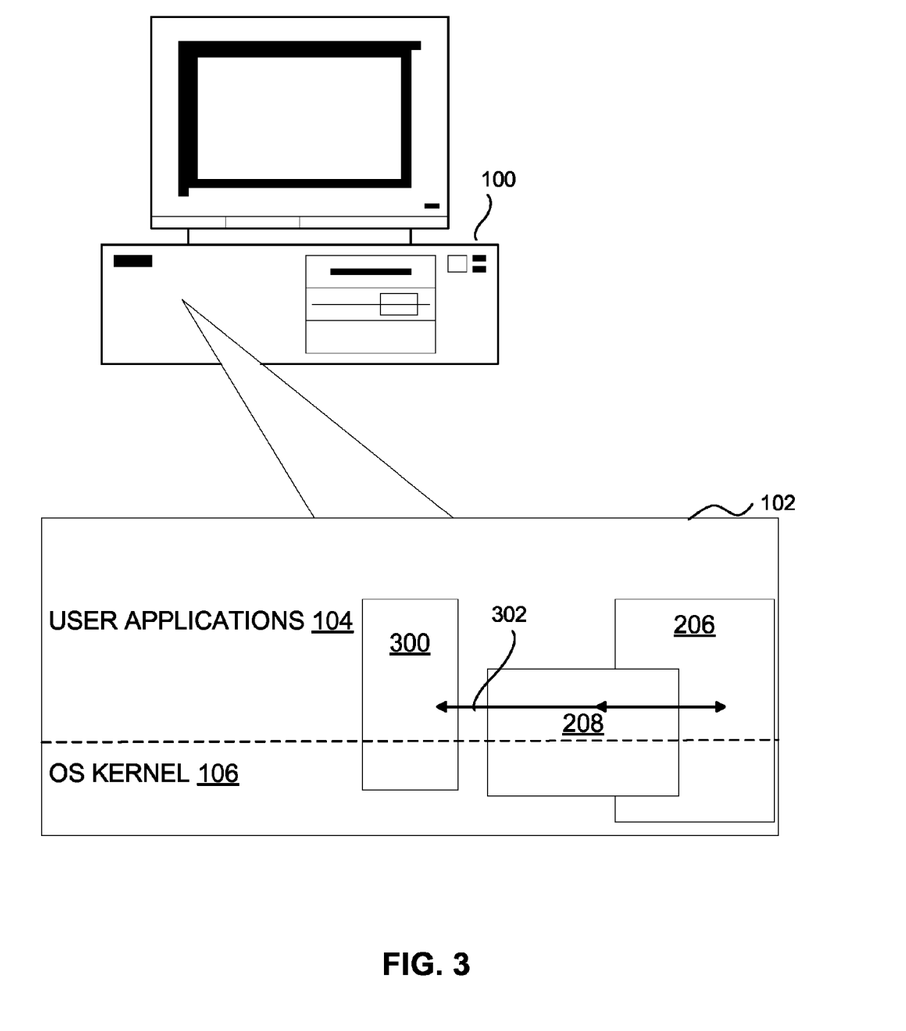
FIG. 3 illustrates the patching process of an installed third party component.

FIG. 3 illustrates the patching process, designated by 302 in the figure. The patches 208 are installed, such that third party software 300 is modified (patched) after the installation of the patches 208.

Generally, the patching information 208 will include replacement code, or links to replacement code, as well as a corresponding list of files that need to be patched (at one extreme, only a single file of the third party software that needs to be patched, in another extreme, all the files provided by the third party as their application software, or installed component(s) may need to be patched, as well as cases in between). Thus, the information 208 can include, e.g., the file names, files types, registry contents information, e.g., registry hives, memory allocation layout procedures, file descriptors, and metadata.

The patching information 208 can be provided in the form of files, which can be used as is (in other words, completely replacing the original files that came with the third party application software, or can be a database or an archive, for example, a zip archive, which is unpacked and then installed into the software environment).

Furthermore, a file whose name is itself an identifier can also include identifiers within it. For example, in one example, a file with a predetermined name includes information about system procedures. For instance, a xxx.DLL (dynamic linked library) file can include a type library that describes objects. The object names identified in the DLL file can be viewed as auxiliary information identifiers. Note that these identifiers also are defined by the patching information 208. For these identifiers, the descriptors are the addresses or other information that characterize the identified system procedures. Thus, the contents of the file, such as procedures names and memory allocation layout, which are not readily derivable from the object code itself, can also be viewed as the auxiliary information.

Note that although control software is not shown in FIGS. 2 and 3, it can be functionally present in patching information 208, and can be used, for example, during installation of patches, or after the patches are installed, and can itself modify the behavior of the application 300.

Figure 4A:
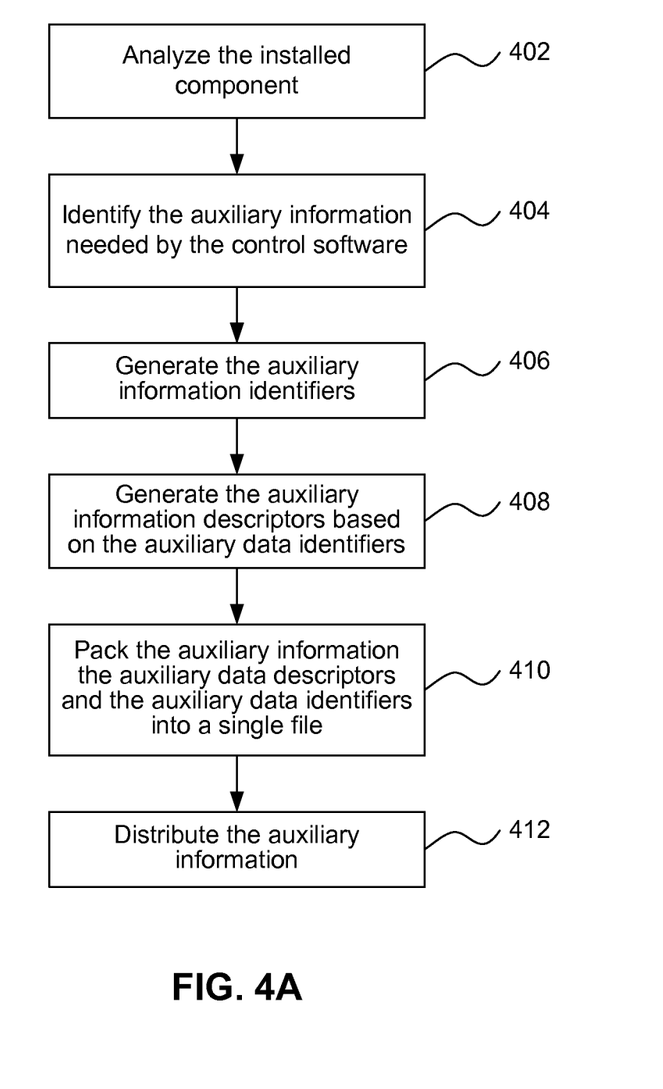
FIG. 4A illustrates one embodiment of the distribution method of the present invention.

FIG. 4A illustrates one embodiment of the method of the present invention. As shown in FIG. 4A, first, the installed component is analyzed e.g., by the control software (step 402). Next, in step 404, auxiliary information needed by the control software is identified. In step 406, the auxiliary information identifiers are generated. In step 408 the descriptors are generated, based on the identifiers. It should be noted that this step may be performed separately, e.g., before installing component. Therefore, a set of redundant auxiliary information may be formed, and then this redundant set can be distributed, or only a subset of information of this set can be distributed, as necessary for installation and/or functioning of the component. In step 410, the auxiliary information, the identifiers, and the descriptors are packed into consistent set of data, e.g. a file (usually a single file for distribution, such as a zip file, or a CAB archive). In step 412, the file (or other block of data) with the auxiliary information is distributed.

The metadata that may be included in the descriptor may be any of:
  Information about a Vendor
  Information about categories
  Information about packagers
  List of available target architectures
  List of available target platforms
  List of available target OS'es
  List of available package types
  Information about package bits Expression
  Information about Application tags
  Vendor Index
  Information about Application Version
  Information about Package indexes can be extracted from an Application Version index.
  Information about a Package Resources
  Information about package metadata
  Information about package bits
  Information about a package certificate. Present only if the package is certified.
  Information about package icons
  Information about package screenshots
  The XML Elements Reference in the descriptor may include any of:
  Link to System index
  Repository feed link
  Link to Vendor index
  Elements that nest Application Packaging Standard categories may include:
  Category name
  Packager name
  Certification level
  Parent element that nests options for administrative privilege requirement.
  Administrative privilege option value
  Package type may have the following function:
  Defines target architectures supported by a certain repository
  Defines target platforms supported by a certain repository
  Envelope (mediator) where the application is executed.
  Defines target OS supported by a certain repository
  Form for adding package to repository
  Application tags extending the basic categories of APS (Application Packaging Standard) Packages.

According to the exemplary embodiment, the files used in the APS package are:
  metadata files;
  control scripts;
  content files.

The APS strictly defines a set of files in the package, the file names, and a structure and syntax (in case of the metadata files). The APS package is a zip file having the extension ".app.zip." The metadata includes:
  APP-META.xml—main package metadata file;
  folder schema/—containing type definitions by application;
  APP-LIST.xml—a list of all package files, every file has a size in bytes and hash SHA256 (e.g.) value. The list of all package files can be digitally signed by one or several packagers or authorities.

Figure 4B:
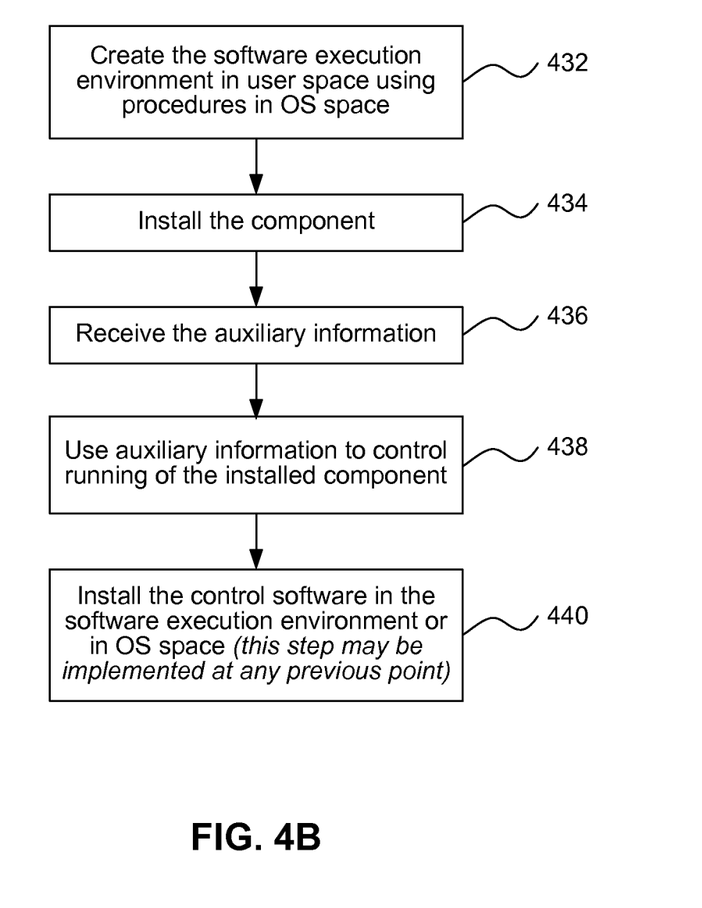
FIG. 4B illustrates how the approach described herein can be used to control installation and running of a third party software component.

FIG. 4B illustrates how the approach described herein can be used to control installation and running of a third party software component. In step 432, a software execution environment is created e.g., in user space. (An example of such an environment may be a VPS (virtual private server, or container) where different VPSs can share the same system file or other components). In step 434, a third party software component is installed. Note also that steps 432 and 434 can be executed in parallel, or in any order.

In step 436, the auxiliary information (including the identifiers and the descriptors) is received, for example, over a network (see also step 412 in FIG. 4A). In step 440 (which can be performed at any time during the process), the control software is installed in the execution environment, for example, in operating system. In step 438, the auxiliary information is used to control or monitor the execution of the third party software component. This can include patching of the code (whether on-the-fly or prior to installation) and any other control over the execution of the third party software component, such that its behavior is different than it otherwise would be.

Figure 6:
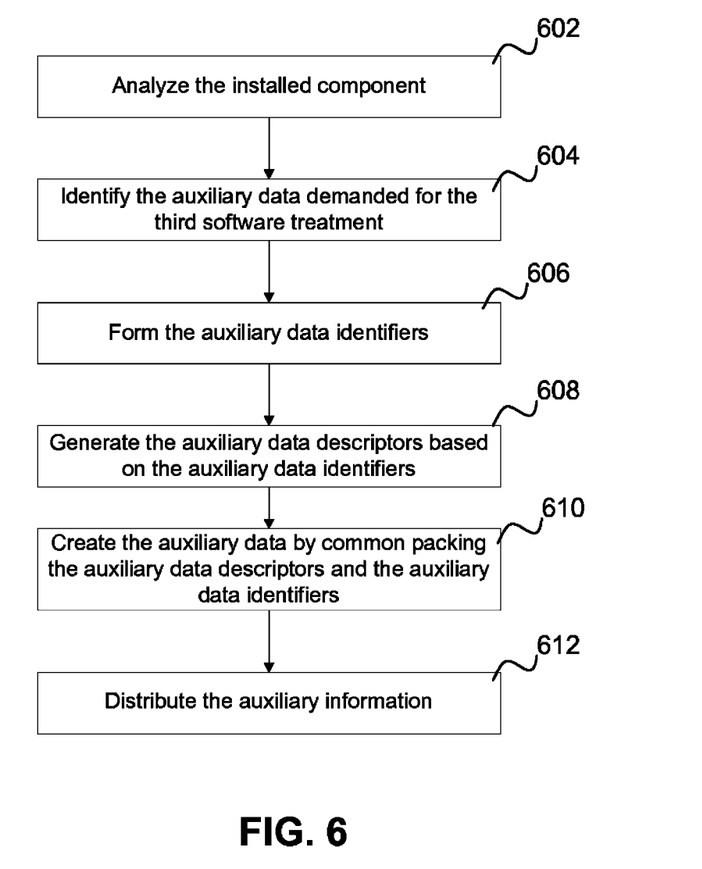
FIG. 6 illustrates generation and distribution of auxiliary information relating to the installed third party component.

FIG. 6 illustrates generation and distribution of auxiliary information relating to the installed third party component. As shown in FIG. 6, in step 602, the installed component is analyzed. In step 604, the auxiliary data needed for the third party software treatment is identified. In step 606, the auxiliary data identifiers are formed. In step 608, the auxiliary data descriptors are generated based on the auxiliary data identifiers. In step 610, the auxiliary data are created by common packing the auxiliary data descriptors and the auxiliary data identifiers. In step 612, the auxiliary information is distributed.

Figure 7:
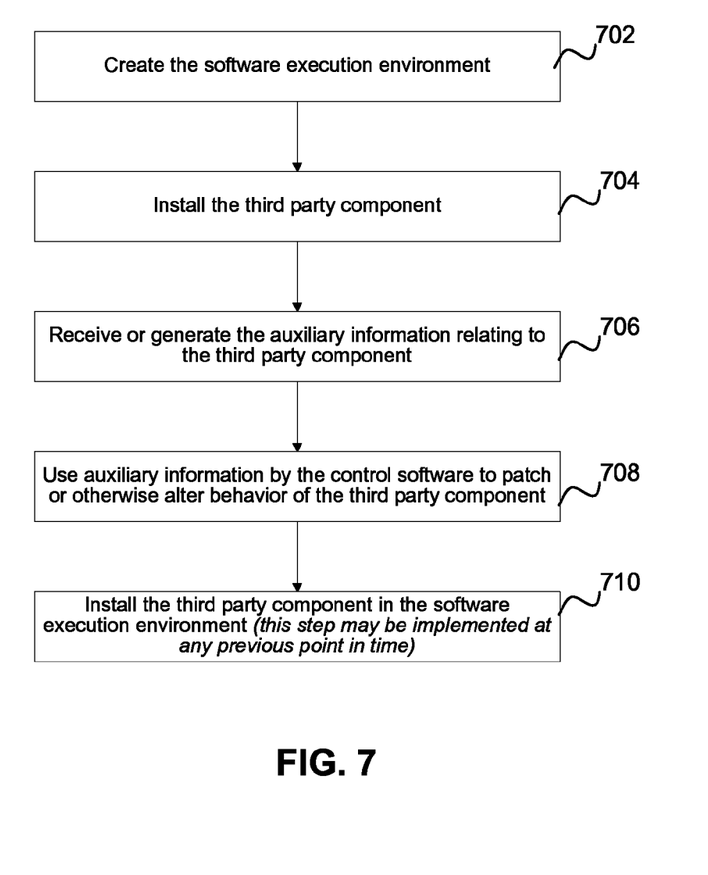
FIG. 7 illustrates modification of a third party component using the auxiliary information.

FIG. 7 illustrates modification of a third party component using the auxiliary information. As shown in FIG. 7, in step 702, the software execution environment is created. In step 704, the third party component is installed. In step 706, the auxiliary information relating to the third party component is received or generated. In step 708, auxiliary information is used by the control software to patch or otherwise alter behavior of the third party component. In step 710, the third party component is installed in the software execution environment (this step may be implemented at any previous point in time).

The various data relating to the third party component may be compiled into a version of execution environment-independent data set for the particular component, and packed into a container. This may involve a .zip or .rar archive, or a more complex structure involving the container and any executables. The control program can unpack and install the data set from the container. As one option an XML file inside the container can be used for unpacking the remainder of the container properly and configuring the execution environment. For example, specific names may be assigned to the same file from the container during, before or after the unpacking, registry settings may be applied to the system, missed components may be downloaded from the network, and/or various remote components may be connected to local software. The control program may provide proper sequence of steps.

Figure 5:
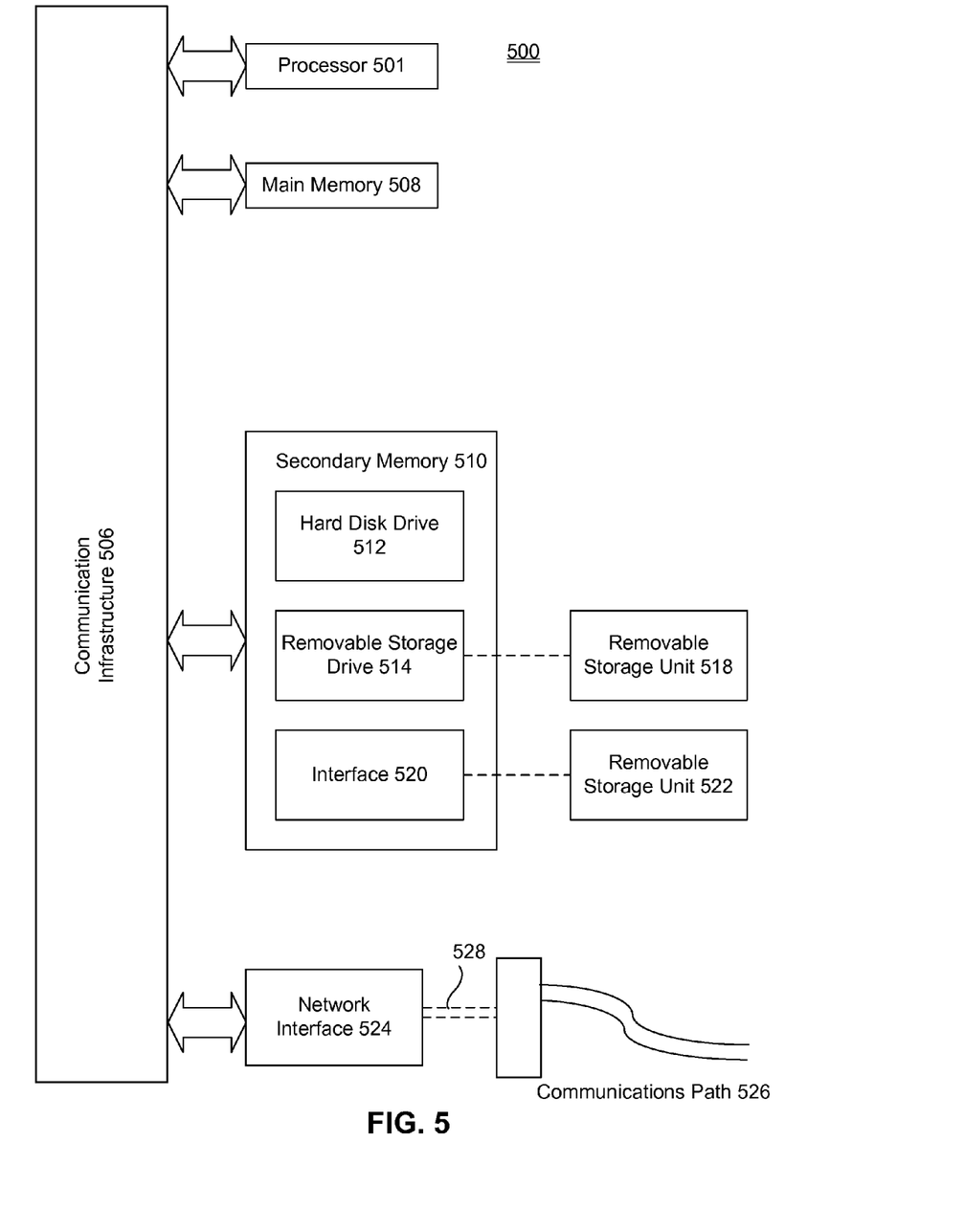
FIG. 5 shows an example of a computer system where the present invention may be used.

An example of a computing system 100 where the present invention may be used is illustrated in FIG. 5. The computing system 100 includes one or more processors, such as processor 504. The processor 504 is connected to a communication infrastructure 506, such as a bus or network). Various software implementations are described in terms of this exemplary computer system. After reading this description, it will become apparent to a person skilled in the relevant art how to implement the invention using other computer systems and/or computer architectures.

Computing system 100 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well-known manner. Removable storage unit 518 represents a magnetic tape, optical disk, or other storage medium that is read by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computing system 100. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to computing system 100.

Computing system 100 may also include one or more communications interfaces, such as communications interface 524. Communications interface 524 allows software and data to be transferred between computing system 100 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 504. Information representing processed packets can also be sent in the form of signals 528 from processor 504 through communications path 526.

The terms "computer program medium" and "computer usable medium" are used to generally refer to media such as removable storage units 518 and 522, a hard disk installed in hard disk drive 512, and signals 528, which provide software to the computing system 100.

Computer programs are stored in main memory 508 and/or secondary memory 510. Computer programs may also be received via communications interface 524. Such computer programs, when executed, enable the computing system 100 to implement the present invention as discussed herein. In particular, the computer programs, when executed, enable the processor 504 to implement the present invention. Where the invention is implemented using software, the software may be stored in a computer program product and loaded into computing system 100 using removable storage drive 514, hard drive 512 or communications interface 524.

CONCLUSION

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for finalizing installation of a server component, the method comprising:
    compiling a version of execution environment-independent data set for the server component;
    packing the data set into a container;
    installing the data set for the server component from the container into an execution environment on a computer, the computer having a version-specific operating system managing a process virtual address space;
    installing a control program to monitor the installed component and configuration of the execution environment;
    receiving, from a remote source, the data set and auxiliary information that includes at least one identifier and at least one descriptor that are related to the installed server component;
    using the control program and the auxiliary information, when the installed server component is activated, to map a correspondence between the process virtual address space and executable code memory, including offset address information of procedures integrated with the installed server component, the correspondence providing information required for executing the procedures integrated with the installed server component, the auxiliary information being mapped including identifier of the procedures and offset address information respective to memory allocation of the procedures;
    using the mapped correspondence to enable operation of the activated installed server component for subsequent operation;
    wherein the identifier uses a number, a checksum or a name of a file or a procedure of the installed server component,
    wherein the descriptor is related to functioning of the installed server component in the execution environment, and describes any of: the memory allocation, allocation of files of the installed server component in a directory structure, and file structure of the installed server component, and
    wherein the container includes metadata corresponding to the descriptor, the metadata including vendor-specific information and target environment specific information.

2. The method of claim 1, wherein the address space is a virtual address space.

3. The method of claim 1, wherein the metadata includes any of:
    information about a vendor;
    information about categories;
    information about packagers;
    list of available target architectures;
    list of available target platforms;
    list of available target OS'es;
    list of available package types;
    information about package bits expression;
    information about Application tags;
    vendor index;
    information about Application Version;
    application version index;
    information about a package resources;
    information about package metadata;
    information about package bits;
    information about a package certificate;
    information about package icons; and
    information about package screenshots.

4. The method of claim 1, wherein the receiving step comprises generating auxiliary information relating to the installed component.

5. The method of claim 1, wherein the auxiliary information comprises a directory descriptor in which the installed component is contained.

6. The method of claim 1, wherein the auxiliary information comprises configuration files for installation of the installed component.

7. The method of claim 1, wherein the installed component is a component of an operating system running inside a Virtual Private Server.

8. The method of claim 1, wherein the identifier includes any of time stamps, CRC, access control information and function names.

9. The method of claim 1, wherein the descriptor includes any of an access control list, a function address offset and a function parameter.

10. The method of claim 1, wherein the descriptor is derived from a debug file of the installed component.

11. The method of claim 1, wherein the auxiliary information is version-specific to the installed component.

12. The method of claim 1, further comprising relocation of the installed component.

13. The method of claim 1, further comprising generating offset address information for functions in object code of the installed component.

14. The method of claim 1, further comprising intercepting, in the control software, input/output operations of the installed component using the auxiliary information.

15. The method of claim 1, wherein the container is a virtual container.

16. The method of claim 1, wherein register and install file contacts are analyzed and an analogous system is recreated on a Virtual Private Server.

17. The method of claim 1, wherein configuration data used by the control program is generated during the installation of a physical server with a corresponding hardware configuration.

18. The method of claim 1, wherein the identifier includes file metadata that is added to those files that previously did not have the file metadata.

19. The method of claim 1, wherein the control software uses the auxiliary information to replace at least some files with links to the files.

20. The method of claim 1, wherein, when a version of the installed component is incompatible with a current version of the operating system, the control software requests, over a network, the auxiliary information.

21. A computer program product comprising non-transitory computer-useable storage medium storing code for implementing the steps of claim 1.

22. A system for configuring an installed server component, the system comprising:

a version of execution environment-independent data set for the server component packed into a container and then installed from the container into an execution environment on a computer, the computer having a version-specific operating system managing a process virtual address space;

a control program that monitors the installed component and configuration of the execution environment;

wherein the data set and auxiliary information that includes at least one identifier and at least one descriptor are received from a remote source;

wherein the control program uses the auxiliary information, when the installed server component is activated, to map a correspondence between the process virtual address space and executable code memory, including offset address information of procedures integrated with the installed server component, the correspondence providing information required for executing the procedures integrated with the installed server component, the auxiliary information being mapped including identifier of the procedures and offset address information respective to memory allocation of the procedures;

the mapped correspondence enabling operation of the activated installed server component for subsequent operation; and wherein the identifier uses a number, a checksum or a name of a file or a procedure of the installed server component, wherein the descriptor is related to functioning of the installed server component in the execution environment, and describes any of: the memory allocation, allocation of files of the installed server component in a directory structure, and file structure of the installed server component, and wherein the container includes metadata corresponding to the descriptor, the metadata including vendor-specific information and target environment specific information.

* * * * *